Jan. 3, 1939.   J. SINKO   2,142,766
STEERING WHEEL DEVICE
Filed July 23, 1937
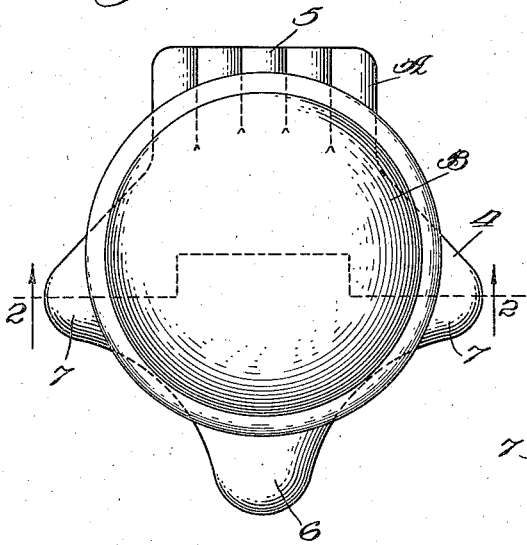
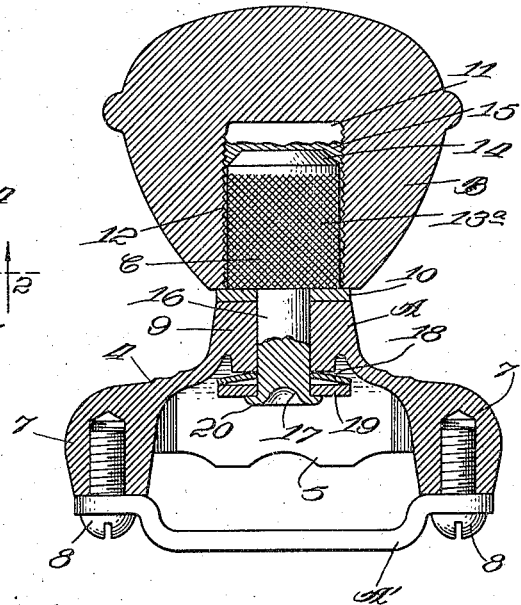
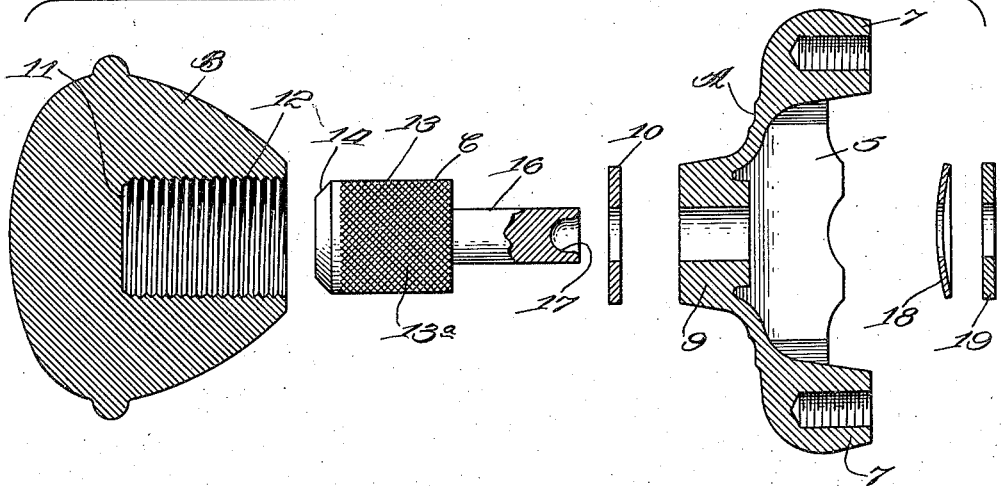
Inventor:
John Sinko.
By Chritton, Wiles, Davis, Hirsch & Dawson
Attys.

Patented Jan. 3, 1939

2,142,766

UNITED STATES PATENT OFFICE 2,142,766

STEERING WHEEL DEVICE

John Sinko, Oak Park, Ill.

Application July 23, 1937, Serial No. 155,313

4 Claims. (Cl. 74—557)

This invention relates to an attachment for a steering wheel, or the like, to facilitate turning the same, and more particularly to a friction mounting for resisting relative turning movement between a hand knob and the supporting bracket.

The primary object of the invention is to provide a thoroughly reliable mounting which will not permit the knob to spin and may be manufactured at a very low cost.

A further object of the invention is to provide an improved method for assembling a steering wheel turning device.

The invention is illustrated in a preferred embodiment in the accompanying drawing, in which:

Figure 1 is a plan view of a steering wheel turning device embodying the invention; Fig. 2, an elevational view partly in section, taken as indicated at line 2—2 of Fig. 1; and Fig. 3, an exploded view, partly in section, showing the relative position of the parts before assembly.

In the embodiment illustrated, A designates a supporting bracket provided with a clamping bar A'; B, an ornamental hand knob; and C, a stud-like journal member adapted to permanently journal the hand knob on the supporting bracket.

The bracket A is of known construction and preferably comprises a die casting 4 having an outwardly extending claw 5 adapted to engage the rim of a steering wheel adjacent to a spoke connection. Opposite from the claw 5 is a supporting foot 6 adapted to rest on the steering wheel spoke. Laterally extending ears 7 are drilled and tapped to receive machine screws 8 whereby the bracket may be clamped in position by means of the clamping bar A'. The upper side of the bracket is provided with an apertured boss 9 whose top portion is flat to receive a bearing washer 10.

The knob B preferably is made of some insulating material such as "Catalin", and may be given a suitable finish to imitate marble, or the like. The knob is drilled, as indicated at 11, and tapped to provide threads 12. The threaded interior of the socket is adapted to be coated with a suitable adhesive or cement to firmly grip the stud member C.

The stud member has an enlarged head portion 13 whose upper end is bevelled, as indicated at 14, and its body portion is knurled, as indicated at 13a, to provide interstices for cement 15 and permanently hold the stud member and knob together. The stud is provided with a journal portion 16 of reduced diameter and its lower end preferably has a hollow point 17. On the lower side of the aperture in the bracket is provided a concavo-convex spring washer 18 and a rigid washer 19 which are adapted to be impaled by the stud member and held in position by swaging the lower end of the stud member thereunder, as indicated at 20.

The parts are designed so that they may be assembled in a novel and inexpensive manner. Before attaching the knob B, the stud member C is resiliently and permanently secured to the bracket portion by impaling the washer 10, bracket 9, spring 18, and washer 19 with the journal portion of the stud member. The assembly is then compressed so as to partially flatten out the dished washer 18, and the end 17 is swaged under the washer 19 by driving a tool into the hollow point. The threaded portion of the socket B is then coated with a suitable cement and the stud C is forced into the socket by means of a straight line movement under considerable pressure, which may be applied by an arbor-press or kick-press.

This construction while inexpensive is thoroughly reliable and the knob cannot be stolen from the bracket. The bearing washer 10 prevents cement, which may have been extruded in the assembling operation, from entering between the bearing surfaces of the washer and bracket, and like the spring washer 18 and the lower washer 19, rotates with the stud member. The compression in the spring 18 provides sufficient friction to prevent the knob from spinning or rattling on the bracket but does not interfere with easy operation of the device.

If desired, the head portions of the screws 8 may be partially cut away so that they may be turned in but one direction by the application of a screw driver, as is well understood in the art. Thus after the device has been installed, it cannot be stolen from the steering wheel without destroying its usefulness.

The foregoing detailed description has been given for clearness of understanding only, and no unnecessary limitations should be understood therefrom, but the appended claims should be construed as broadly as permissible, in view of the prior art.

I claim:

1. A steering wheel turning device comprising: an apertured supporting bracket; a stud member provided with a shoulder portion supported by the top of said bracket and having a shank portion of reduced diameter extending through said aperture; a spring and washer on said shank at the under side of the bracket, said spring and washer being held in compressed position by a head on the lower end of said stud so as to resist rotation; and a hand knob permanently mounted on the top portion of the stud.

2. A device as specified in claim 1, in which the spring is in the form of a resilient dished washer.

3. A device as specified in claim 1, in which the spring is in the form of a resilient dished washer having its convex side presented upwardly.

4. A device as specified in claim 1, in which the knob has an internally threaded socket, and the top portion of the stud is knurled and cemented to said threaded portion of the knob.

JOHN SINKO.